United States Patent [19]

Nagayama

[11] Patent Number: 5,142,881
[45] Date of Patent: Sep. 1, 1992

[54] AUTOMOBILE AIR CONDITIONING SYSTEM

[75] Inventor: Yoshiaki Nagayama, Hiroshima, Japan

[73] Assignee: Mazda Motor Corporation, Hiroshima, Japan

[21] Appl. No.: 677,401

[22] Filed: Apr. 1, 1991

[30] Foreign Application Priority Data

Mar. 31, 1990 [JP] Japan .................................. 2-86497
Jan. 31, 1991 [JP] Japan .................................. 3-32470

[51] Int. Cl.⁵ ............................................ F25B 49/02
[52] U.S. Cl. ...................................... 62/228.5; 62/244
[58] Field of Search ..................... 62/228.4, 228.5, 244, 62/323.1

[56] References Cited

U.S. PATENT DOCUMENTS

| 4,483,151 | 11/1984 | Fujioka et al. | 62/244 X |
| 4,637,220 | 1/1987 | Sakano | 62/244 X |
| 4,637,222 | 1/1987 | Fujiwara et al. | 62/244 |
| 4,873,837 | 10/1989 | Murray | 62/244 X |
| 4,959,974 | 10/1990 | Kusakabe | 62/228.5 |

FOREIGN PATENT DOCUMENTS 63-184517 7/1988 Japan .

Primary Examiner—William E. Tapolcai
Attorney, Agent, or Firm—Fleit, Jacobson, Cohn, Price, Holman & Stern

[57] ABSTRACT

An air conditioning system including main and auxiliary cooling units for air conditioning the inside of an automotive vehicle has a compressor, variable in discharge volume, for discharging a compressed refrigerant to the main and auxiliary cooling units. The compressor is controlled to vary its discharge volume, according to a thermal loading on the vehicle, so as to provide conditioning air cooled by the main cooling unit to a desired temperature according to the thermal load. When a demand for cooling from the auxiliary cooling unit is greater than a demand for cooling from the main cooling unit, the compressor is controlled to vary its discharge volume according to the demand for cooling from the auxiliary cooling unit, and vice versa.

14 Claims, 6 Drawing Sheets

AUTOMOBILE AIR CONDITIONING SYSTEM

The present invention relates to an automobile air conditioner and, more particularly, to an automobile air conditioner equipped with a variable volume compressor capable of varying the discharging volume of refrigerant supplied to an evaporator according to thermal loads of a vehicle.

BACKGROUND OF THE INVENTION

1. Field of the Invention

An automobile air conditioner typically varies the discharging capacity of a compressor, such as a variable volume refrigerant compressor, to suitably control the temperature of air according to differences between a predetermined target temperature and an actual temperature.

2. Description of Related Art

As is known from, for instance, Japanese Unexamined Patent Publication 63 184517, an automobile air conditioner is equipped with a main air cooling device which performs air cooling for occupants of a front seat or seats and an auxiliary air cooling device for portions of the automobile interior other than those cooled by the main air cooling device. Such an auxiliary air cooling device may be used, for example, to cool occupants of rear seats, or of the middle seats in a wagon-type vehicle. Typically, an evaporator of the auxiliary air cooling device is supplied with a portion of a refrigerant passing to an evaporator of the main air cooling device through a compressor. Nevertheless, because the auxiliary air cooling device is located far from the compressor as compared with the main air cooling device, the refrigerant is apt to have warmed up before reaching the evaporator of the auxiliary air cooling device, so that the auxiliary air cooling device tends to cause a decrease in air cooling power as compared with the main air cooling device.

SUMMARY OF THE INVENTION

The present invention has the primary object of providing an automobile air conditioning system having a main air cooling device equipped with a variable volume compressor capable of varying the volume of refrigerant discharged and an auxiliary air cooling device supplied with a refrigerant from the variable volume compressor.

It is another object of the present invention to provide an automobile air conditioning system having main and auxiliary air cooling devices in which, by variably controlling the discharge capacity of the variable volume compressor, the auxiliary air cooling device can provide satisfactorily cooled air according to particular demands of the occupants of the vehicle.

These objects are achieved by providing an automobile air conditioning system equipped with main and auxiliary air cooling means and refrigerant compressing means disposed close to the main air cooling means. The refrigerant compressing means varies its discharge volume according to thermal load, such as that created by solar radiation and heat, to which the vehicle is subjected, so as to provide conditioning air cooled, by the main air cooling means, to a desired temperature according to the thermal load. When an auxiliary cooling unit cooling demand, due to, for example, a low temperature setting of the auxiliary cooling unit, is greater than a demand for cooling on the main cooling unit according to the thermal load, a regulating means controls the compressor so that it varies its discharge volume according to the cooling demand of the auxiliary cooling unit rather than according to thermal load.

With the air conditioning system of the present invention, the discharge volume of the refrigerant compressing means is varied in response to the thermal load of the vehicle, and the temperature of conditioning air is appropriately controlled to a comfortable temperature under the thermal load. When an air conditioning demand of the auxiliary air conditioning means is higher than that of the main air conditioning means, the compressing means is controlled to vary the discharge volume in response to the conditioning demand of the auxiliary air conditioning means, with first priority being given to the thermal load. The auxiliary air conditioning means, therefore, provides satisfactory air conditioning in response to the particular air conditioning demand.

BRIEF DESCRIPTION OF THE DRAWINGS

The above and other objects and features of the invention will apparent to those skilled in the art from the following description of preferred embodiments thereof when considered in conjunction with the accompanying drawings, in which similar reference numerals have been used to designate the same or similar elements throughout the drawings, and wherein.

DETAILED DESCRIPTION OF THE PREFERRED EMBODIMENTS

Figure 1:
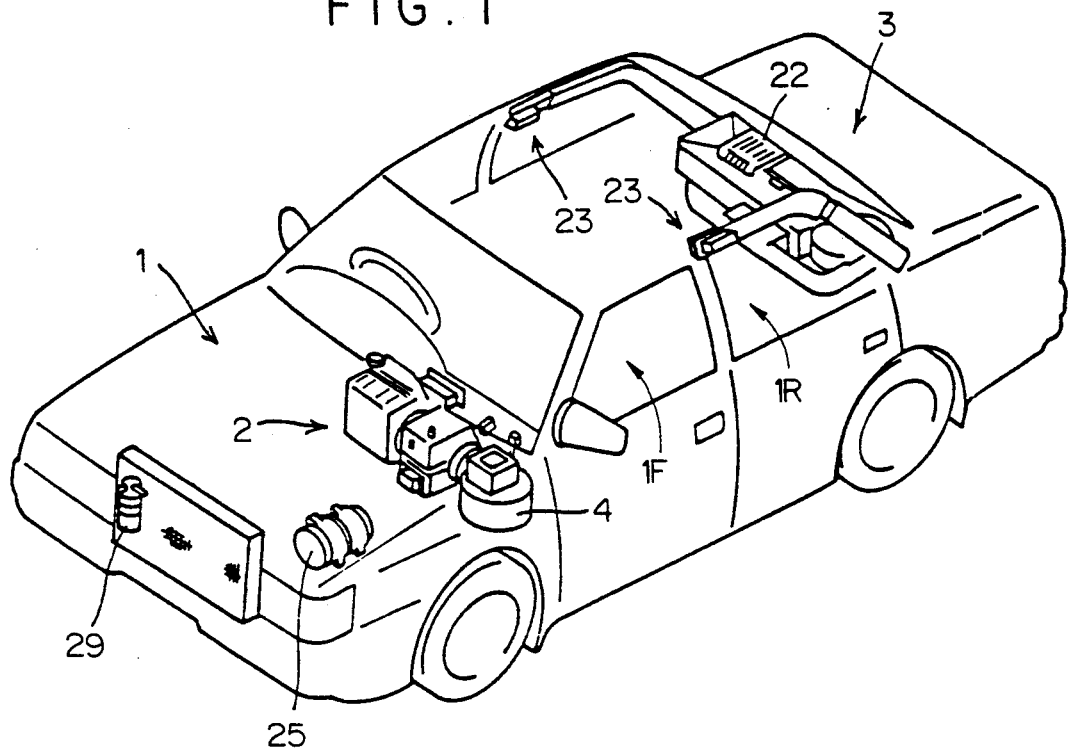
FIG. 1 is a schematic illustration of an automotive vehicle equipped with an air conditioning system in accordance with a preferred embodiment of the present invention.
Figure 2:
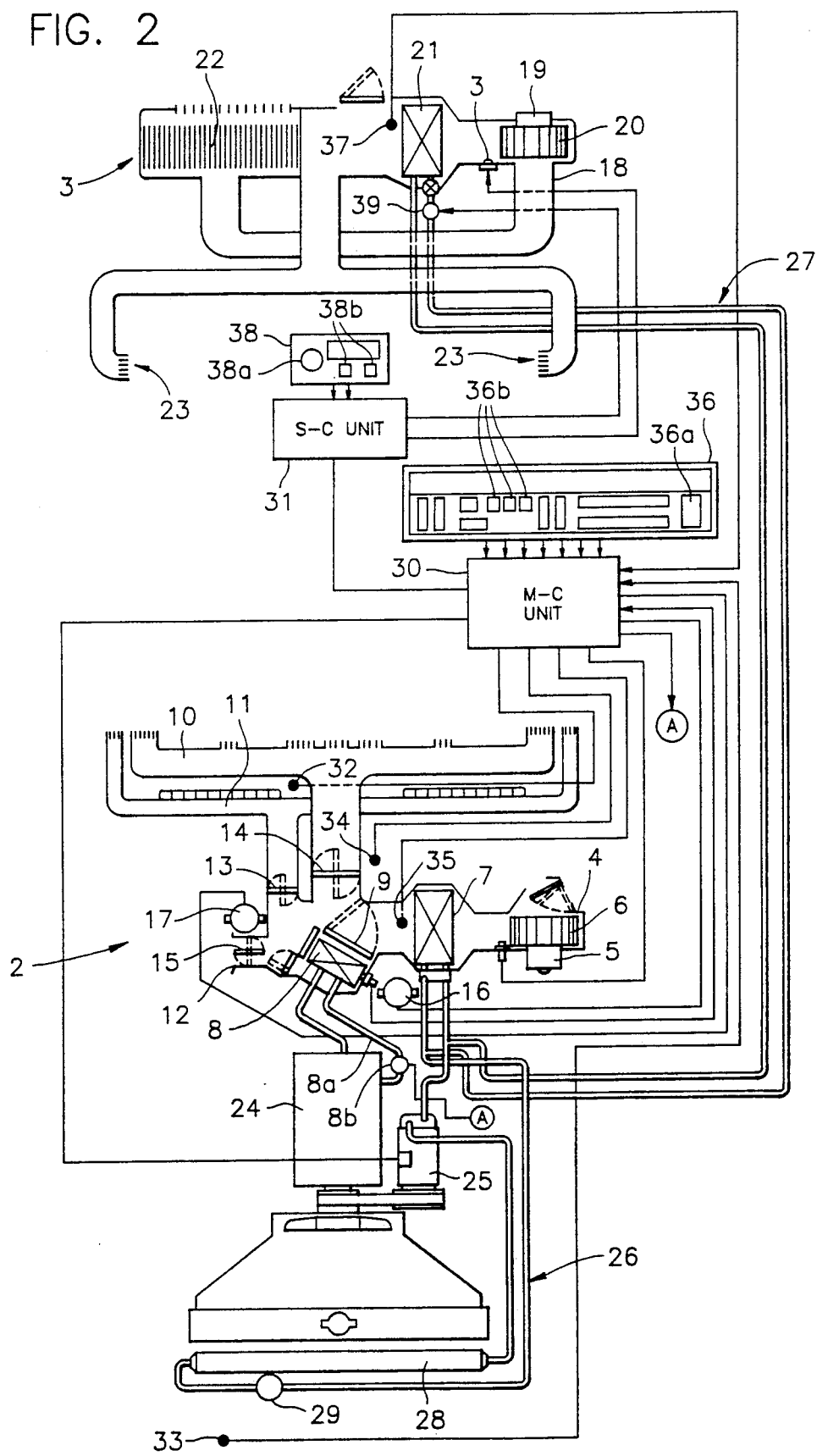
FIG. 2 is a diagrammatical illustration of the air conditioning system.

Referring to the drawings in detail and, in particular, to FIGS. 1 and 2, shown is an air conditioning system (which is hereinafter termed simply an "air-conditioner"), in accordance with a preferred embodiment of the present invention, installed in an automobile. The system has a main air cooling unit 2, which performs air cooling mainly for occupants of front seats (not shown), located in a front compartment 1F of the vehicle 1, and an auxiliary air cooling unit 3 for air cooling primarily the occupants of rear seats located in a rear compartment 1R of the vehicle 1. The main air cooling unit 2 is equipped with a main duct 4, through which air inside and outside of the vehicle 1 is selectively introduced into the main air cooling unit 2. The main air cooling unit 2 comprises a blower 6 disposed in the main duct 4 and driven by a drive motor 5, an evaporator 7, through which refrigerant passes, for cooling air forwarded from the blower 6, and a heater core 8, through the interior of which engine cooling water passes, to heat the air passed through the evaporator 7. The main cooling unit 2 further comprises an air mixing door 9 to regulate the inflow quantity supplied to the heater core 8 of air which has passed through the evaporator 7. Air is conditioned to a desired temperature (cool or warm) by controlling the operation of the evaporator 7 and heater core 8 and the degree of opening of the mixing door 9. The main duct 4 has, at its downstream end, a vent duct 10, a defroster duct 11, a heater duct 12, and dampers 13, 14 and 15 disposed, at their junctions with the main duct 4, respectively, to open and close the ducts 10, 11 and 12.

Air mixing door 9 is opened and closed by a drive motor 16, and the respective dampers 13, 14 and 15 are driven by a drive motor 17 to open and close. For each mode of air forwarding, namely, a vent mode, a bi-level mode, a heat mode, a defroster-and-heat mode and a defroster mode, all of which are well known, the ducts 13, 14 and 15 are selectively opened and closed by the drive motor 17 and, if desired, by controlling their degrees of opening, according to the desired mode, so as to forward air conditioned to a desired temperature through respective outflow ports formed at the end of the duct 10, 11 or 12 towards the vehicle compartment.

Auxiliary air cooling unit 3 has a blower 20 located in a duct 18 and driven by a drive motor 19, and an evaporator 21 disposed in the duct 18 at its downstream end. Air is introduced into the duct 18 via an air purifier 22 and is forwarded by the blower 20 to the evaporator 21. The air cooled by the evaporator 21 is further forwarded towards the occupant or occupants of the rear seats from outflow ports 23 and 23 disposed at left and right sides of the rear seats.

A refrigerant compressor 25, which is capable of varying in discharge volume and driven by an engine 24, is connected to the evaporator 7 by a first refrigerant circulation passage 26, with a cooler condenser 28 and a receiver tank 29 connected thereto on a downstream side of the variable volume compressor 25. The evaporator 21, in the auxiliary air cooling unit 3, is connected to a second refrigerant circulation passage 27 branching off from the first refrigerant circulation passage 26, so that refrigerant is introduced into the evaporator 21 of the auxiliary air cooling unit 3 from the variable volume compressor 25.

The air conditioner has a main control (M-C) unit 30, mainly comprising a general purpose microcomputer, which controls the operation of the main air cooling unit 2, and a subsidiary or secondary control (S-C) unit 31, mainly comprising a general purpose microcomputer, to control the operation of the auxiliary air cooling unit 3. The main control unit 30 receives signals from a solar radiation (S-R) sensor 32 to detect the quantity of solar radiation onto the vehicle, from temperature (A-T, R-T and C-A) sensors 33, 34 and 35, respectively, to detect the temperatures of ambient air surrounding the vehicle, of air in the vehicle compartment, and of air cooled by the evaporators 7 and 21, and from a main control switch unit 36 which will be explained in detail later. The main control unit 30 outputs, according to these input signals, a control signal to control the operation of the variable volume compressor 25.

The sub-control unit 31 receives a signal from a sub-control switch unit 38, which will be explained in detail later, and outputs signals to a power transistor 39 which outputs current to the drive motor 19 of the blower 20, and a control valve 40, which controls the inflow quantity of refrigerant to the evaporator 21 disposed in the second refrigerant circulation passage 27.

Figure 3:
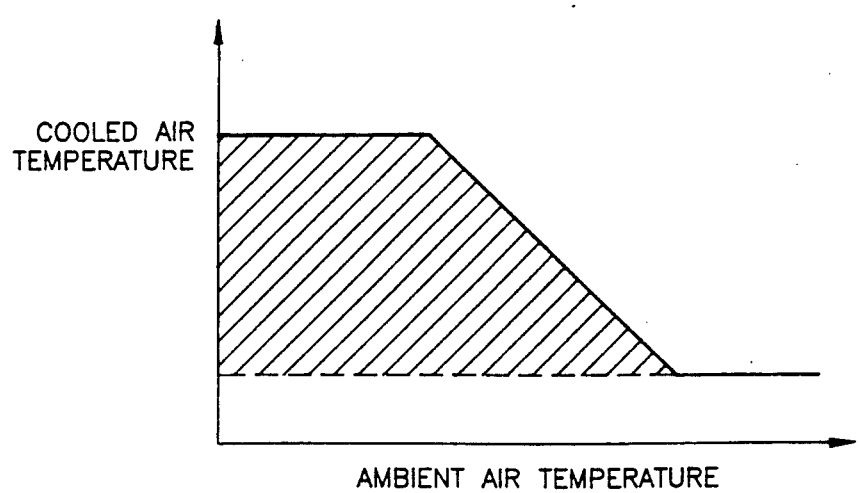
FIG. 3 is a diagram showing cooling characteristics of the air conditioning system.

Main air cooling unit 2 is equipped with a main control switch unit 36, which is disposed on an instrument panel (not shown) inside the vehicle compartment and is provided with various switches including a main air conditioning switch (MCS) 36a to actuate the evaporator 7 and a temperature setting switch 36b to set a desired temperature of conditioned air discharged towards the front seats by varying the degree of opening of the air mixing door 9 and the amount of air forwarded by the blower 6. According to the air conditioning temperature (T) set by the temperature setting switch 36b of the main control switch unit 36 and the thermal load on the vehicle 1, which is determined based on the signals from the radiation (S-R) sensor 32 and temperature (A-T, R-T and C-A) sensors 33, 34 and 35, the main control unit 30 outputs a control signal to the variable volume compressor 25 so as to variably regulate the discharge volume of the variable volume compressor 25 according to air conditioning characteristics shown by a solid line in FIG. 3. That is, the discharge volume of the variable volume compressor 25 is made larger so as to lower the cooled temperature of air when air outside of the vehicle 1 is at higher temperatures, and smaller so as to permit the cooled temperature of air to increase when the ambient air is at lower temperatures. The evaporator 8 of the main cooling unit 2 is supplied with cooling water from the engine 24 via a water supply passage 8a with a control valve 8b.

Sub-control switch unit 38 is provided with various switches including an air conditioning system (SCS) switch 38a to actuate the evaporator 21 and a temperature setting switch 38b to set a desired temperature (t1) of conditioned air discharged towards the rear seats, etc. The subcontrol unit 31, when receiving signals from the subcontrol switch unit 38, outputs a signal to the main control unit 30 so as, if necessary, to cause the variable volume compressor 25 to variably regulate the discharge volume of the compressor 25 so that it remains within the range indicated by the shaded portion in FIG. 3.

Figure 4:
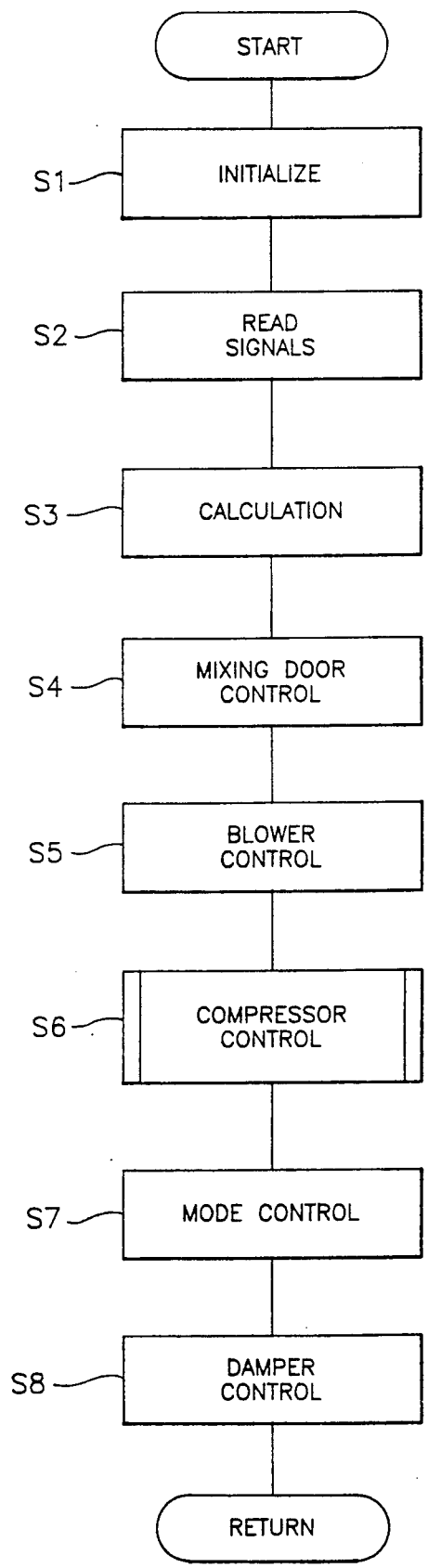
FIG. 4 is a flow chart illustrating a main control routine for a controller.
Figure 5:
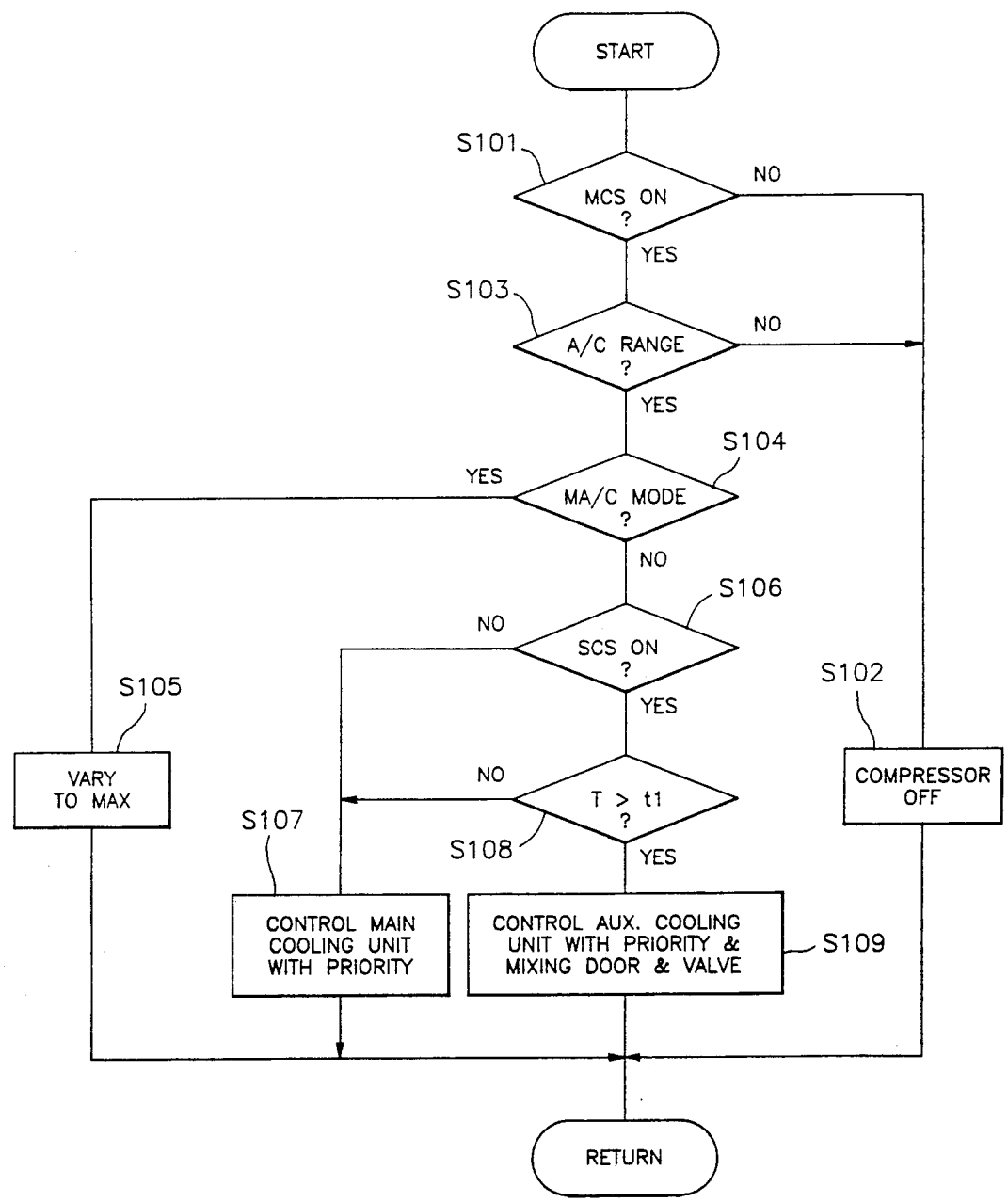
FIG. 5 is a flow chart illustrating a compressor control subroutine for the controller.

The operation controlled by the main control unit 30 of the air conditioner, depicted in FIGS. 1 and 2, is best understood by reviewing FIGS. 4 and 5, which are flow charts illustrating a main control routine and a compressor control subroutine, respectively, for the microcomputer of the main control unit 30. Programming a computer is a skill well understood in the art. The following description is written to enable a programmer having ordinary skill in the art to prepare an appropriate program for the microcomputer. The particular details of any such program would, of course, depend upon the architecture of the particular computer selected.

Main Control Routine

Referring now to FIG. 4, which is a flow chart of the main or general sequence routine for the microcomputer of the main control unit 30, the first step S1 is to initialize the microcomputer of the main control routine to perform a selection of the dampers 13 to 15 and an opening control of the selected damper. After the initialization at step S1, the main control unit 30 reads various signals, such as signals from the solar radiation (S-R) sensor 32, ambient air temperature (A-T) sensor 33, room air temperature (A-T) sensor 34 and temperature setting switch 38b of the main control switch unit 36, to vary the degree of opening of the air mixing door 9 and the amount of air forwarded by the blower 6, according to the air conditioning temperature (T) set by the temperature setting switch 36b of the main control switch unit 36. Based on the desired air temperature, at step S3, control signals are calculated, according to programmed procedures, for the control of the operation of the blower 6, evaporator 7 and air mixing door 9 necessary to provide conditioned air of the desired temperature. Based on these control signals, the air mixing door 9 is controlled to regulate and adjust its opening at step S4, and the blower 6 is controlled to regulate the quantity of air introduced therethrough into the main cooling unit 2 at step S5. After the control of the blower 6, a compressor control subroutine is called for at step S6 in order to control or change the discharge volume of the variable volume compressor 25.

Referring to FIG. 5, which is a flow chart of the compressor control subroutine, the first step at step S101 is to make a decision as to whether the main control switch (MCS) 36a is in ON. If the answer to the decision is no, namely, the main control switch 36a is in an OFF state, the variable volume compressor 25 is stopped at step S102. Then, the step orders return to the main routine. However, if the answer to the decision at step S101 is yes, namely, the main control switch 36a is in an ON state, a decision is made, at step S103, based on signals from the sensors 32, 33 and 34, as to whether the thermal load of the vehicle is within a range of temperatures requiring automatic air conditioning (A/C). If the answer is no, this indicates that the thermal load, e.g., in times such as in winter, is low enough so as to make it not necessary to cool the vehicle compartment. Then, since the variable volume air compressor 25 need not be operated, the main control unit 30 causes the program to proceed forward to step S102 to stop compressor 25. On the other hand, if the answer to the decision is yes, this indicates that the ambient air temperature is comparatively high and in the automatic air conditioning range. A decision is then made at step S104 as to whether the mode of air conditioning which has been previously established is a maximum air cooling (MA/C) mode. If the answer is yes, the variable volume compressor 25 is controlled to vary its discharge volume to a maximum discharge volume (MAX) at step S105. Then, the step orders return to the main routine. If the answer to the decision at step S104 is no, a decision is made at step S106 as to whether the sub-air conditioning switch (SCS) 38a of the sub-control switch unit 38 for the auxiliary air cooling unit 3 is ON. If the answer is no, the main air cooling unit 2 is operated, giving priority to the auxiliary air cooling unit 3, by varying the discharge volume of the variable volume compressor 25 according to the signal from the main control switch (MCS) 36a provided based on the thermal load and the desired temperature of conditioning air by the main cooling unit 2 at step 107. If the answer to the decision at step S106 is yes, this indicates that the auxiliary cooling unit 3 is operated, and then a decision is made at step 108 to see whether the desired temperature T, set through the temperature setting switch 36b of the main control switch unit 36, is greater than the desired temperature t1, set through the temperature setting switch 38b of the sub-control switch unit 38. If the answer is no, this indicates a situation in which a demand on air cooling by the main air cooling unit 2 is higher than a demand on air cooling by the auxiliary air cooling unit 3. Then, the discharge volume of the variable volume compressor 25 is varied according to the signals from the temperature setting switch 36b of the main control switch unit 36 and radiation and temperature sensor 32, 33 and 34 at step 107 in order to carry out air conditioning, giving the main air cooling unit 2 first priority. Otherwise, if the answer to the decision at step S108 is yes, this indicates a case in which a demand for air cooling by the auxiliary air cooling unit 3 is higher than a demand for air cooling by the main air cooling unit 2. Then, the discharge volume of the variable volume compressor 25 is varied according to the signals from the temperature setting switch 38b of the control switch unit 38 and radiation and temperature sensors 32, 33 and 34 at step S109 in order to carry out air conditioning, giving the auxiliary air cooling unit 3 priority over the main air cooling unit 2, so as to condition the rear seat area to the desired temperature t1. At the same time, at step S109, the main control unit 30 provides a signal to the control valve 8b and/or the drive motor 16, according to the desired temperature T, to decreasingly change the opening of the air mixing door 9 and/or increase the amount of cooling water delivered to the heater core 8 from the engine, thereby preventing the front seat area from being undesirably overcooled. The final step S107 or step S109 orders return to the main routine.

Main Control Routine-continued

Referring back to the main routine in FIG. 4, after the control of the variable volume compressor 25, any desired air forwarding mode, such as the vent mode, the bi-level mode, the heat mode, the defrost-and-heat mode or the defroster mode, is provided by selectively opening and closing the dampers 13-15 at step S7. Finally, at step S8, the selected damper or dampers are regulated in its or their respective degree or degrees of opening.

In the manner described above, the discharge volume of the variable volume compressor 25 is varied in response to the thermal load on the vehicle, such as that provided by ambient air and solar radiation, by the main control unit 30 so as to provide an appropriately controlled temperature of air for air conditioning. In addition to this, when a signal is output from the sub-control unit 31 to indicate a higher demand of air conditioning in the rear seats than the front seats, the discharge volume of the variable volume air compressor 25 is variably regulated by the main control unit 30 in response to the air conditioning demand in the rear seats. Accordingly, a desired, comfortable air conditioning in the rear seats is provided to the rear seat area by the auxiliary air cooling unit 3 in response to the air conditioning demand.

Figure 6:
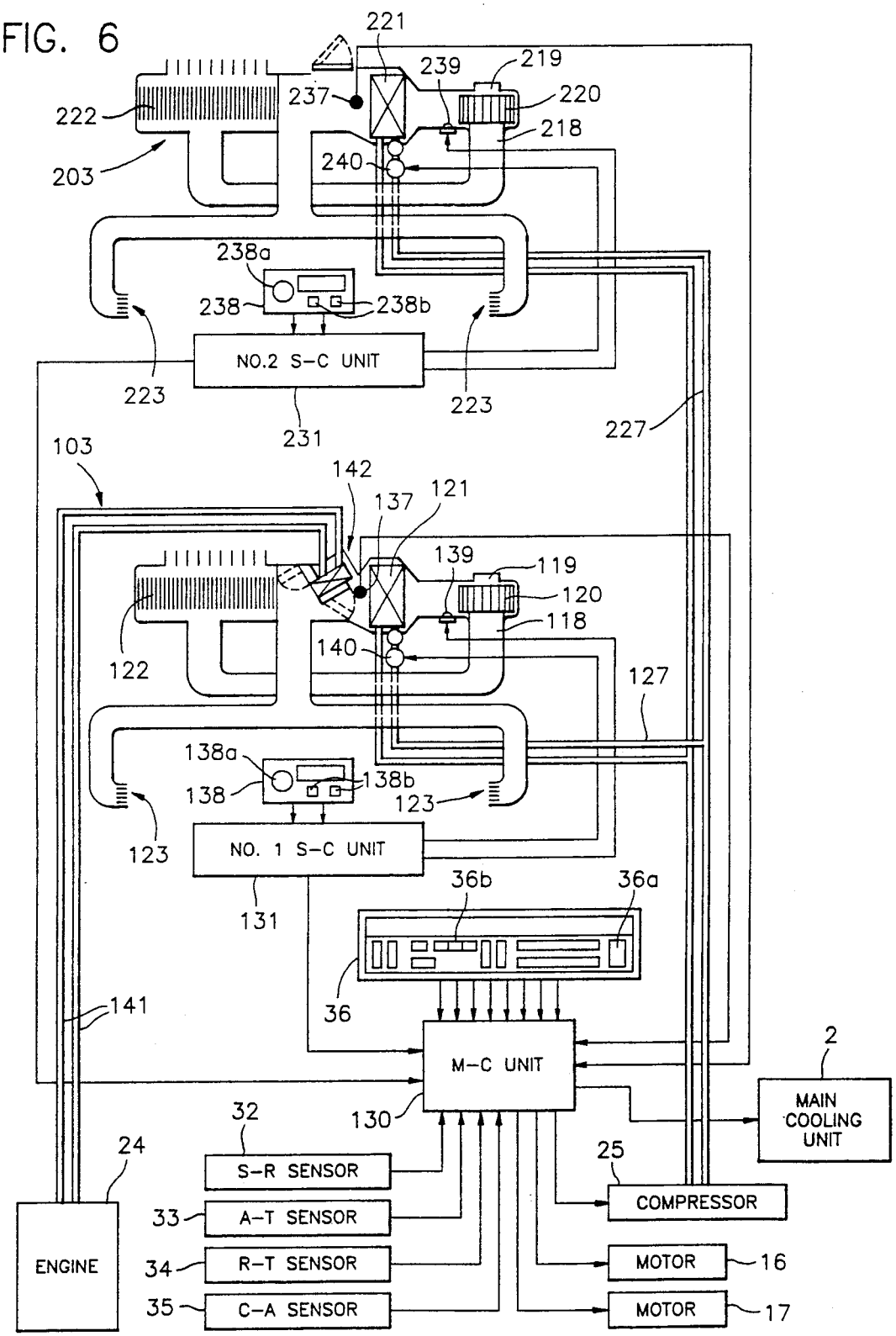
FIG. 6 is a diagrammatical illustration, similar to FIG. 2, of an air conditioning system in accordance with another preferred embodiment of the present invention.

Referring to FIG. 6, an air conditioner in accordance with another preferred embodiment of the present invention, designed and adapted to be suitable for a vehicle having three seating areas, is shown. This system comprises first or middle and second or rear auxiliary air cooling units in addition to a main cooling unit. The main cooling unit, which is the same in structure and operation as that of FIG. 2 and, therefore, is not shown in detail in FIG. 6, is controlled by a main control unit 130 in the substantially same manner as the main control unit 30 of the previous embodiment. The main control unit 130 receives signals from a solar radiation (S-R) sensor 32 to detect the quantity of solar radiation supplied onto the vehicle, an ambient temperature (A-T)

sensor 33 to detect the temperature of ambient air surrounding the vehicle, a room temperature (R-T) sensor 34 to detect the temperature of air in the vehicle compartment, and a cooled air temperature (C-T) sensor 35 to detect the temperature of air in the vehicle by the main cooling (M-C) unit 2.

First auxiliary air cooling unit 103 has a blower 120 driven by a drive motor 119 located within a duct 118, and an evaporator 121 disposed in the duct on the downstream side of the blower 120. Air is introduced into the first auxiliary air cooling unit 103 via an air purifier 122 disposed in the duct 118 and forwarded by the blower 120 to the evaporator 121 for cooling. The air, cooled by the evaporator 121, is directed towards the occupants of the middle seats through air outflow ports 123 disposed on left and right sides of the middle seats, so as to provide a well controlled temperature condition in the middle seating area.

Similarly, second auxiliary air cooling unit 203 has a blower 220 driven by a drive motor 219 located within a duct 218, and an evaporator 221 disposed in the duct 218 on the downstream side of the blower 220. Air is introduced into the second air cooling unit 203 via an air purifier 222 disposed in the duct 218 and forwarded by the blower 220 to the evaporator 221 for cooling. The air, cooled by this evaporator 221, is directed towards the occupants of the rear seats through air outflow ports 223 disposed on left and right sides of the rear seats, so as to provide a well controlled temperature condition in the middle seating area.

Air temperature sensors 137 and 237 detect the temperatures of the cooled air, downstream of the evaporators 121 and 221, cooled by the first and second auxiliary air cooling units 103 and 203, respectively, to provide temperature signals. These temperature signals are input to the main control unit 130.

A refrigerant compressor 25, capable of varying in discharge volume, is driven by an engine 24, and is connected to the evaporator 7 by a first refrigerant circulation passage 26 (see FIG. 2) with a cooler condenser and a receiver tank 29 (see FIG. 2) connected thereto on a downstream side of the variable volume compressor 25. The evaporator 121 in the auxiliary air cooling unit 103 is connected to a second refrigerant circulation passage 127, branching off from the first refrigerant circulation passage 26, so that refrigerant is introduced into the evaporator 121 of the auxiliary air cooling unit 103 from the variable volume compressor 25. The evaporator 221 in the auxiliary air cooling unit 203 is connected to a third refrigerant circulation passage 227 branching off from the first refrigerant circulation passage 26, so that refrigerant is introduced into the evaporator 221 of the auxiliary air cooling unit 203 from the variable volume compressor 25.

First and second auxiliary air cooling units 103 and 203 are controlled by first and second sub-control units 131 and 231, respectively. Signals are input to these sub-control units 131 and 231 from the first and second temperature setting switches 138b and 238b, respectively, of the first and second sub-control switch units 138 and 238. In response to the signals, the first and second sub-control units 131 and 231, respectively, output control signals to cause power transistors 139 and 239 to output current to the drive motors 119 and 219 of the blowers 120, 220, and to control valves 140 and 240 disposed in the refrigerant circulation passages 127 and 227, respectively, so as to control the quantities of refrigerant delivered to the evaporators 121 and 221. The first auxiliary air cooling unit 103 is provided with a heater unit 142, which is located downstream of the evaporator 121 and supplied with engine cooling water through a water supply passage 141 connected to the engine 124.

The air conditioner has a main control (M-C) unit 30, a first sub-control (No.1 S-C) unit 131 and a second sub-control (No.2 S-C) unit 231, all units mainly comprising general purpose microcomputers, to control the operations of the main control unit and the first and second auxiliary air cooling units, respectively. The main control unit 30 receives signals from the sensors 32, 33, 34 and 35 to detect a thermal load on the vehicle and signals from main, first sub- and second sub-control switch units 36, as will be explained later. The main control unit 30 outputs, according to these input signals, a control signal to control the operation of the variable volume compressor 25.

First sub-control unit 131 receives a signal from a sub-control switch unit 138 and outputs signals to a power transistor 139 which outputs current to the drive motor 119 of the blower 120, and a control valve 140 which controls the inflow quantity of refrigerant to the evaporator 121 disposed in the second refrigerant circulation passage 127. The second sub-control unit 231 receives a signal from a sub-control switch unit 238 and outputs signals to a power transistor 239 which outputs current to the drive motor 219 of the blower 220, and a control valve 240 which controls the inflow quantity of refrigerant to the evaporator 221 disposed in the second refrigerant circulation passage 227.

First sub-control switch unit 138 is provided with various switches, including a first sub-air conditioning switch (No.1 SCS) 138a to actuate the evaporator 121 and a temperature setting switch 138b to set a desired temperature (t1) of conditioning air to be discharged towards the middle seats area. The first sub-control unit 131, when receiving signals from the sub-control switch unit 138, outputs a signal to the main control unit 130 so as, if necessary, to cause the variable volume compressor 25 to variably regulate the discharge volume of the compressor 25 within a range of the shaded portion in FIG. 3.

Similarly, second sub-control switch unit 238 is provided with various switches including a second sub-air conditioning switch (No.2 SCS) 138a to actuate the evaporator 121 and a temperature setting switch 238b to set a desired temperature (t2) of conditioning air to be discharged towards the rear seat area. The second sub-control unit 231, when receiving signals from the sub-control switch unit 238, outputs a signal to the main control unit 130 so as, if necessary, to cause the variable volume compressor 25 to variably regulate the discharge volume of the compressor 25 and keep it within the range indicated by the shaded portion of FIG. 3.

The main control unit 130 receives signals from the main, first sub- and second sub-control switch unit 36, 136 and 236. According to these input signals, the main control unit 130 outputs control signals for drive motors 16 and 17 to drive the air mixing door and dampers (which are the same as those of the main cooling unit of the previous embodiment) of the main air cooling unit and also for a variable volume compressor 25.

Figure 7:
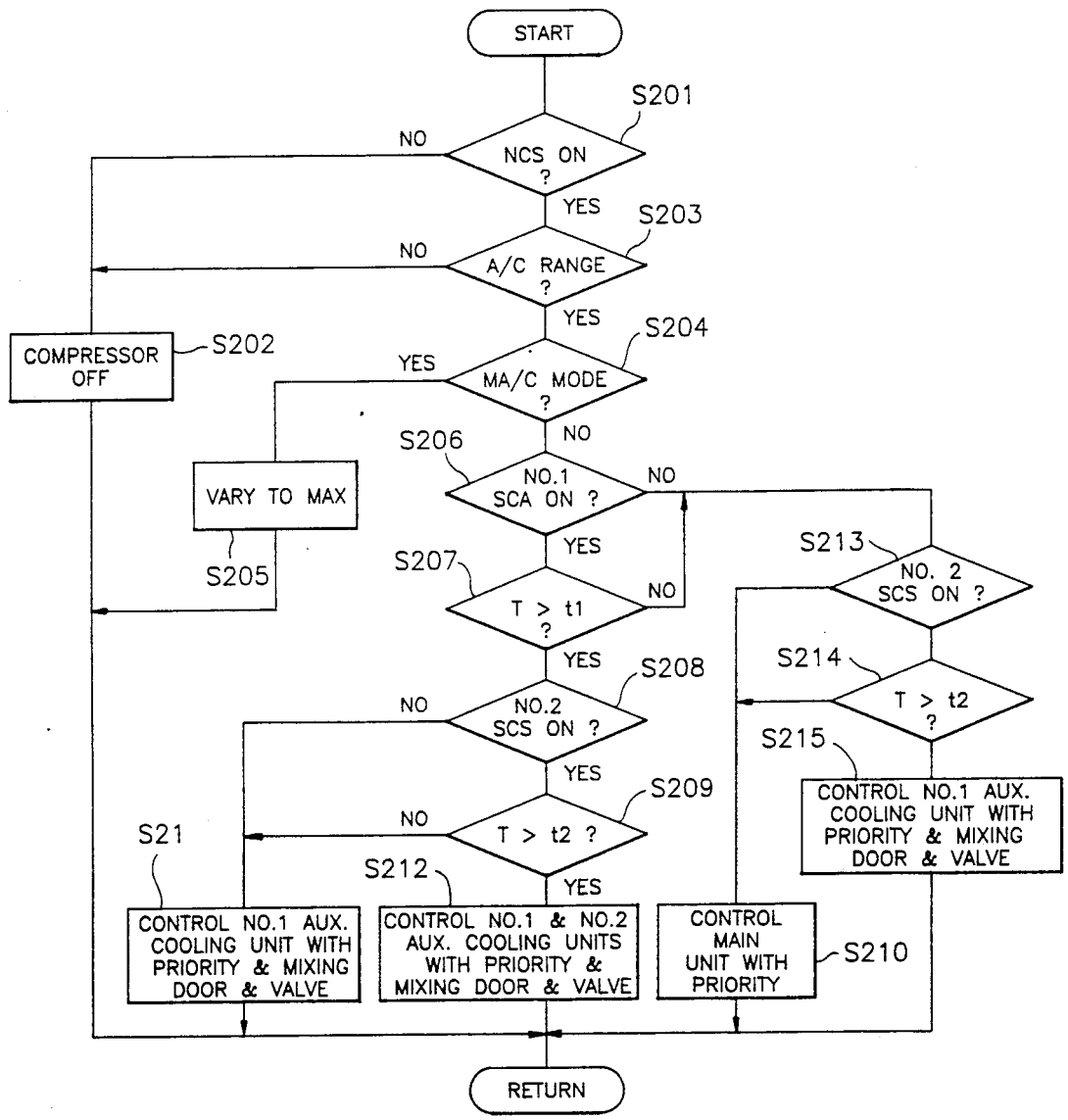
FIG. 7 is a flow chart, similar to FIG. 5, illustrating a compressor control subroutine for a controller in the other embodiment.

The operation controlled by the main control unit 130 of the air conditioner, depicted in FIG. 6, is best understood by reviewing FIG. 7, which is a flow chart illustrating a compressor control subroutine for the microcomputer of the main control unit 30, along with the main control routine shown in FIG. 4.

Main Control Routine

The air conditioner shown in FIG. 6 is controlled by means of the main control unit 130 according to substantially the same main control routine as shown in FIG. 4 for the previous embodiment.

Compressor Control Subroutine

Variable volume compressor 25 is also controlled for the first and second auxiliary air cooling units 103 and 203 according to a compressor control subroutine, illustrated in a flow chart in FIG. 7, at step S6 in the main control routine shown in FIG. 4. The first step of the subroutine, i.e., step S201, is to make a decision as to whether the main control switch (MCS) 36a of the main control switch unit 36 is in an ON state. If the answer to the decision is no, the main air cooling unit 2 is not required to operate, and the variable volume compressor 25 is stopped at step S202. Then, the step orders return to the main control routine. However, if the answer to the decision at step S201 is yes, the main control switch 36a is in an ON state, and a decision is made, at step S203, based on signals from the sensors 32, 33 and 34, as to whether the thermal load of the vehicle is within a range of temperatures for automatic air conditioning (A/C). If the answer is no, this indicates that the thermal load, in conditions such as those occurring in winter, is sufficiently low as to make it unnecessary to cool the vehicle compartment. Then, the variable volume air compressor 25 need not be operated. The main control unit 130 causes the program to proceed to step S202. On the other hand, if the answer to the decision is yes, this indicates that the ambient air temperature is comparatively high and in the automatic air conditioning range. Then, a decision is made at step S204 as to whether the mode of air conditioning previously established is a maximum air cooling (MA/C) mode. If the answer is yes, the variable volume compressor 25 is controlled to vary its discharge volume to its maximum discharge volume (MAX) at step 205. Then, the step orders return to the main routine. If the answer to the decision at step S204 is no, a decision is made at step S206 to see whether the first sub-control switch (No.1 SCS) 138a for the first auxiliary air cooling unit 103 is in an ON state. If the answer to the decision at step S206 is yes, then, a decision is made at step S207 to see whether the desired air temperature T for air conditioning of the front seats area by the main cooling unit 2 is higher than the desired temperature t1 for air conditioning of the middle seating area by the first auxiliary air cooling unit 103. If the answer to the decision at step S207 is yes, this indicates a case in which the demand on air conditioning by at least the first auxiliary air cooling unit 103 is higher than that of the main air cooling unit 2. Then, decisions similar to the decisions of steps S206 and 207, carried out as to the first auxiliary air cooling unit 103, are made at steps S208 and 209 as to the second auxiliary air cooling unit 203.

More specifically a decision is made at step S208 to see whether the second sub-control switch (No.2 SCS) 238a of the second auxiliary air cooling unit 203 is in an ON state. If the answer to the decision is no, this indicates a case in which a demand on air conditioning by the first auxiliary air cooling unit 103 is higher than a demand on air conditioning by the main air cooling unit 2, and the second auxiliary air cooling unit 203 is not required to operate. Then, the discharge volume of the variable volume compressor 25 is varied according to the signals from the first sub-control switch (SCS-1) 138a and the sensors 32-34 at step 211 in order to carry out air conditioning, with the first auxiliary air cooling unit 103 having first priority so as to condition the middle seat area to the desired temperature t1. At the same time, at step S209, the main control unit 30 provides a signal to the control valve 8b and/or the drive motor 16 so as, according to the desired temperature T, to decreasingly change the opening of the air mixing door 9 and/or increase the amount of cooling water delivered to the heater core 8 from the engine, thereby preventing the front seat area from being undesirably overcooled. However, if the answer to the decision at step S208 is yes, this indicates that both the first and second auxiliary air cooling units 103 and 203 are required to operate. Then, a decision is made at step S209 to see whether the desired temperature T is higher than a desired temperature t2 of air conditioning for the rear seat area by the second auxiliary air cooling unit 203. If the answer to the decision is yes, this indicates a case in which all the air cooling units, namely the main air cooling unit 2 and both the first and second auxiliary air cooling units 103 and 203, are required to operate, and the demand on air cooling by the second auxiliary air cooling unit is higher than the demand on air cooling by the main air cooling unit 2. Then, the discharge volume of the variable volume compressor 25 is varied according to the signals from the first and second sub-control switches (No. 1 SCS and No.2 SCS) 138a and 238a, respectively, at step 212 in order to carry out air conditioning mainly by the first and second auxiliary air cooling units 103 and 203, with priority given to the main air cooling unit 2. Also, at step S212, the main control unit 30 provides a signal to the control valve 8b and/or the drive motor 16 so as, according to the desired temperature T, to decreasingly change the opening of the air mixing door 9 and/or increase the amount of cooling water delivered to the heater core 8 from the engine, thereby preventing the front seat area from being undesirably overcooled. However, if the answer to the decision at step S209 is no, this indicates a case in which, although both the first and second auxiliary air cooling units 103 and 203 are required to operate, the demand on air cooling of the first auxiliary air cooling unit 103 only is higher than that of the main air cooling unit 2. Then, the discharge volume of the variable volume compressor 25 is varied according to the signal from the first sub-control switch (No. 1 SCS) 138a at step 211 in order to carry out air conditioning with the first auxiliary air cooling unit 103 having first priority, so as to condition the middle seat area to the desired temperature t1. The opening of the air mixing door 9 and/or the increase in the amount of cooling water delivered to the heater core 8 from the engine are decreasingly changed according to the desired temperature T so as to prevent the front seat area from being undesirably overcooled.

If the answer to the decision at step S206 is no, this indicates a case in which at least the first auxiliary cooling unit 103 is not required to operate, and if the answer to the decision at step S207 is no, this indicates a case in which, while all the cooling units are required to operate, the demand on air cooling by the main air cooling unit 2 is higher than at least the demand on air cooling by the first auxiliary air cooling unit 103. Then, the same decisions at steps S213 and 214 as at steps S208 and 209 are carried out as to the second sub-control switch 238a.

However, if the answer to the decision at step S213 is yes, this indicates that only the second auxiliary air cooling unit 203, other than the main air cooling unit 2, is required to operate. Then, a decision is made at step S214 to see whether the desired air temperature T is higher than the desired temperature t2 of air conditioning the rear seating area by the second auxiliary air cooling unit 203. If the answer to the decision is yes, this indicates a case in which the demand on air cooling by the second auxiliary air cooling unit 203 is higher than the demand on air cooling by the main air cooling unit 2. Then, the discharge volume of the variable volume compressor 25 is varied according to the signals from the second sub-control switches (No.2 SCS) 238a at step S215 so as to carry out air conditioning mainly by the second auxiliary air cooling unit 203, giving priority to the main air cooling unit 2, so as to condition the rear seat area to the desired temperature t2. According to the desired temperature T, the opening of the air mixing door 9 and/or increase in the amount of cooling water delivered to the heater core 8 from the engine is decreasingly changed so as to prevent the front seats area from being undesirably overcooled.

If the answer to the decision at step S213 is no, this indicates a case in which neither auxiliary cooling unit 103 or 203 is required to operate, or, if the answer to the decision at step S214 is no, this indicates a case in which, while the second auxiliary cooling unit 203 is required to operate, the demand on air cooling by the second auxiliary air cooling unit 203 is not higher than the demand on air cooling by the main air cooling unit 2. Then, the discharge volume of the variable volume compressor 25 is varied based on only the signal from the main control switch (MCS) 38a and the sensors 32-34 at step 210 in order to carry out air conditioning with the main air cooling unit 2 having first priority.

After any of the steps S202, S205, S210, S211, S212 or S215, when the compressor is controlled in its discharge volume or stopped in operation, a return to the main control routine is ordered.

In this manner, the main control unit 130 varies the discharge volume of the variable volume compressor 25 in response to heat, such as from solar radiation and from ambient air, acting on the vehicle as an external thermal load, so as to suitably control the temperature of air conditioning. In addition, when signals from the first and second sub-control units 131 and 231 indicate that the demand for air conditioning in the middle seats and/or rear seating areas is higher, the discharge volume of the variable volume compressor 125 is variably regulated by the main control unit 130 in response to the high air conditioning demand, so as to make it possible to provide a comfortable air conditioning over the seating area of the vehicle.

Moreover, in a case in which air conditioning of the rear seating area by the second auxiliary air cooling unit 203 is given priority, although there is concern regarding over-cooling of the rear seating area by the first auxiliary air cooling unit 103, nevertheless, such over-cooling can be prevented by supplying an increased amount of engine cooling water to the heater unit 142 of the main air cooling unit 2.

It is to be understood that when the air conditioner is installed in a rear engine car, in which a variable volume compressor is located behind a rear seat area, the main cooling unit and the auxiliary cooling unit for the rear seat area may be simply switched for each other and controlled in the same manner as described in the above preferred embodiments.

It is also to be understood that although the present invention has been described in detail with respect to a preferred embodiment thereof, various other embodiments and variants are possible which fall within the scope and spirit of the invention, and such embodiments and variants are intended to be covered by the following claims.

What is claimed is:

1. An air conditioning system for conditioning air inside of an automotive vehicle, comprising:

compressing means capable of varying a discharge volume thereof for compressing and discharging a refrigerant;

control means for detecting a thermal loading on said automotive vehicle to vary said discharge volume of said compressing means according to said thermal loading;

main air cooling means, disposed near said compressing means, for cooling air with said refrigerant, said refrigerant being delivered thereto from said compressing means, said air being cooled to a first desired temperature which is manually set according to a demand for cooling a specific volume in said automotive vehicle, toward which air, conditioned by said main air cooling means, is directed; and auxiliary air cooling means, disposed away from said compressing means, for cooling air with said refrigerant delivered from said compressing means to a second desired temperature which is manually set, independently of said first desired temperature, according to a demand for cooling another specific area in said automotive vehicle, toward which air, conditioned by said auxiliary air cooling means, is directed, said auxiliary air cooling means being operable simultaneously with said main air cooling means, said control means comparing the first desired temperature and the second desired temperature, determining a lower one of the first and second desired temperatures, and adjusting and forcing said compressing means to variably adjust said discharge volume depending upon the lower one of said first and second desired temperatures.

2. An air conditioning system as defined in claim 1, wherein said control means comprises at least a temperature sensor for detecting a temperature of ambient air outside of said automotive vehicle.

3. An air conditioning system as defined in claim 2, wherein said control means further comprises a temperature sensor for detecting a temperature inside of said automotive vehicle.

4. An air conditioning system as defined in claim 2, wherein said control means further comprises a radiation sensor for detecting solar radiation on said automotive vehicle.

5. An air conditioning system as defined in claim 1, and further comprising another auxiliary air cooling means disposed away from said main and auxiliary air cooling means for cooling air with said refrigerant delivered from said compressing means to a desired temperature which is manually set according to a demand for cooling an area between said specific areas in said automotive vehicle, toward which air, conditioned by the other auxiliary air cooling means, is directed, said adjusting means forcing said compressing means to variably adjust said discharge volume depending upon at least a lowest one of said desired temperatures.

6. An air conditioning system as defined in claim 5, wherein said control means further comprises a temperature sensor for detecting a temperature inside of said automotive vehicle.

7. An air conditioning system as defined in claim 5, wherein said control means further comprises a radiation sensor for detecting solar radiation on said automotive vehicle.

8. An air conditioning system as defined in claim 1, wherein said main air cooling means cools air directed toward an occupant of a front seat of the vehicle and said auxiliary air cooling means cools air directed toward an occupant of a rear seat of the vehicle.

9. An air conditioning system for conditioning air inside of an automotive vehicle, comprising:
   compressing means capable of varying a discharge volume thereof for compressing and discharging a refrigerant;
   control means for detecting a thermal loading on said automotive vehicle to vary said discharge volume of said compressing means according to said thermal loading;
   main air cooling means, disposed near said compressing means, for cooling air with said refrigerant, said refrigerant being delivered thereto from said compressing means, said air being cooled to a desired temperature which is manually set according to a demand for cooling a specific volume in said automotive vehicle, toward which air, conditioned by said main air cooling means, is directed;
   auxiliary air cooling means, disposed away from said compressing means, for cooling air with said refrigerant delivered from said compressing means to a desired temperature which is manually set according to a demand for cooling another specific area in said automotive vehicle, toward which air, conditioned by said auxiliary air cooling means, is directed, said control means adjusting and forcing said compressing means to variably adjust said discharge volume depending upon a lower one of said desired temperatures; and
   supplementary control means for forcing said main air cooling means, in operation, to increasingly change a temperature of air cooled by said main air cooling means when said desired temperature set according to a demand for cooling said specific area is lower than said desired temperature set according to a demand for cooling the other specific area.

10. An air conditioning system as defined in claim 9, wherein said supplementary control means comprises valve means for changing a quantity of cooling water supplied to said main cooling unit from an engine.

11. An air conditioning system as defined in claim 9, wherein said supplementary control means comprises door means for changing a quantity of air delivered from said main air cooling means.

12. An air conditioning system for conditioning air inside of an automotive vehicle, comprising:
   compressing means capable of varying a discharge volume thereof for compressing and discharging a refrigerant;
   control means for detecting a thermal loading on said automotive vehicle to vary said discharge volume of said compressing means according to said thermal loading;
   main air cooling means, disposed near said compressing means, for cooling air with said refrigerant, said refrigerant being delivered thereto from said compressing means, said air being cooled to a desired temperature which is manually set according to a demand for cooling a specific volume in said automotive vehicle, toward which air, conditioned by said main air cooling means, is directed;
   auxiliary air cooling means, disposed away from said compressing means, for cooling air with said refrigerant delivered from said compressing means to a desired temperature which is manually set according to a demand for cooling another specific area in said automotive vehicle, toward which air, conditioned by said auxiliary air cooling means, is directed, said control means adjusting and forcing said compressing means to variably adjust said discharge volume depending upon a lower one of said desired temperatures;
   another auxiliary air cooling means disposed away from said main and auxiliary air cooling means for cooling air with said refrigerant delivered from said compressing means to a desired temperature which is manually set according to a demand for cooling an area between said specific areas in said automotive vehicle, toward which air, conditioned by the other auxiliary air cooling means, is directed, said adjusting means forcing said compressing means to variably adjust said discharge volume depending upon at least a lowest one of said desired temperatures; and
   supplementary control means for forcing said main air cooling means, in operation, to increasingly change a temperature of air cooled by said main air cooling means when said desired temperature set according to a demand for cooling said specific area is lower than said desired temperature set according to a demand for cooling the other specific area.

13. An air conditioning system as defined in claim 12, wherein said supplementary control means comprises valve means for changing a quantity of cooling water supplied to said main air cooling means from an engine.

14. An air conditioning system as defined in claim 12, wherein said supplementary control means comprises door means for changing a quantity of air delivered from said main air cooling means.

* * * * *